(12) United States Patent
Yasunaga

(10) Patent No.: US 7,866,902 B2
(45) Date of Patent: Jan. 11, 2011

(54) LIGHT CONTROLLING APPARATUS AND OPTICAL APPARATUS

(75) Inventor: Shinji Yasunaga, Asaka (JP)

(73) Assignee: Olympus Corporation, Tokyo (JP)

( * ) Notice: Subject to any disclaimer, the term of this patent is extended or adjusted under 35 U.S.C. 154(b) by 289 days.

(21) Appl. No.: 12/144,820

(22) Filed: Jun. 24, 2008

(65) Prior Publication Data

US 2009/0003824 A1 Jan. 1, 2009

(30) Foreign Application Priority Data

Jun. 26, 2007 (JP) .............................. 2007-167314

(51) Int. Cl.
*G03B 9/02* (2006.01)
(52) U.S. Cl. .................................................... 396/508
(58) Field of Classification Search .................. 396/508
See application file for complete search history.

(56) References Cited

U.S. PATENT DOCUMENTS 4,684,233 A * 8/1987 Kodaira et al. ................. 396/90
5,847,874 A * 12/1998 Sasao et al. .................. 359/554
6,720,995 B1 * 4/2004 Kaneda et al. ........... 348/208.8
7,708,478 B2 * 5/2010 Ryynanen et al. ........... 396/463
2002/0031353 A1 * 3/2002 Naganuma .................. 396/452
2008/0024654 A1 * 1/2008 Shinohara .................... 348/362

FOREIGN PATENT DOCUMENTS

JP 2005-128450 5/2005

* cited by examiner

*Primary Examiner*—W. B. Perkey
(74) *Attorney, Agent, or Firm*—Scully, Scott, Murphy & Presser, P.C.

(57) ABSTRACT

A small-size light controlling apparatus in which, it is not necessary to draw a wire for a diaphragm control, from a diaphragm mechanism, and an optical apparatus in which the light controlling apparatus is used, are provided. The light controlling apparatus includes a substrate having an optical aperture which is fixed, a diaphragm blade which is displaceable, a first magnet which is fixed to the diaphragm blade, and a coil which is disposed around the substrate. An external magnetic field which acts on the first magnet is changed according to an electric power supply to the coil, and the diaphragm blade is displaced by displacing the first magnet according to the change in the external magnetic field.

1 Claim, 7 Drawing Sheets

LIGHT CONTROLLING APPARATUS AND OPTICAL APPARATUS

CROSS-REFERENCE TO RELATED APPLICATION

The present application is based upon and claims the benefit of priority from the prior Japanese Patent Application No. 2007-167314 filed on Jun. 26, 2007; the entire contents of which are incorporated herein by reference.

BACKGROUND OF THE INVENTION

1. Field of the Invention

The present invention relates to a light controlling apparatus and an optical apparatus.

2. Description of the Related Art

In an ultra-small image pickup mechanism used in a cellular phone and an endoscope, an optical system having a simple structure without an aperture control function has been used. With increase in number of pixels of a small image pickup element in recent years, a demand for an ultra-small aperture control mechanism for having a high image quality has been increasing. As an example of an optical diaphragm apparatus which can be used in such ultra-small image pickup apparatus, an aperture control mechanism disclosed in Japanese Patent Application Laid-open Publication No. 2005-128450 will be described by using FIG. 7.

Diaphragm blades 1 and 2 are pivoted to a base plate 20. At one end of the diaphragm blades 1 and 2, one end of a first shape memory alloy 3 is engaged, and is put around a clip 7. A bias is applied on the pair of diaphragm blades 1 and 2 in a direction of closing, by springs 4a and 4b. One end of a second shape memory alloy 5 is fixed to the clip 7, and one end of a spring 6 is engaged with the clip 7, thereby applying the bias on the clip in a downward direction. The shape memory alloy 3 is self-heated by an SMA drive circuit 12, and moves the diaphragm blades 1 and 2. When there is a substantial change in an environment, the apparatus is protected by the second shape memory alloy 5, and a stabilized control independent of a temperature change, is carried out.

In a small image pickup apparatus having a high resolution, generally, a light controlling apparatus such as an aperture controlling mechanism is disposed between a plurality of lenses. In a conventional aperture controlling mechanism, it is necessary to draw a wire for supplying an electric power from the aperture mechanism to a shape memory alloy. However, normally, a gap between the two lenses is extremely small, and it is quite difficult to draw a wire through the gap. Moreover, the necessity of wire has been an obstacle in a size reduction. Furthermore, when it is desirable to be accommodated in a case in which an image pickup optical system is sealed, such as in an endoscope, it is substantially difficult to draw a wire from a sealed case

SUMMARY OF THE INVENTION

The present invention has been made in view of the abovementioned circumstances, and an object of the present invention is to provide a small-size light controlling apparatus in which it is not necessary to draw a wire for an aperture control, from an aperture mechanism, and an optical apparatus in which the light controlling apparatus is used.

To solve the abovementioned issues and to achieve the object, according to the present invention, there can be provided a light controlling apparatus including a substrate having an optical aperture which is fixed, an incident-light controlling means which is displaceable, a first magnet which is fixed to the incident-light controlling means, and a coil which is disposed around the substrate, and an external magnetic field which acts on the first magnet is changed according to a change in an electric power supply to the coil, and the incident-light controlling means is displaced by displacing the first magnet according to the change in the external magnetic field.

According to a preferable aspect of the present invention, it is desirable that the light controlling apparatus has a bias applying means which applies a bias to a predetermined displacement, on the incident-light controlling means which is displaceable.

According to a preferable aspect of the present invention, it is desirable that the bias applying means is formed by a second magnet which is provided independent of the first magnet.

According to a preferable aspect of the present invention, it is desirable that the incident-light controlling means is a diaphragm ring having an opening larger than the optical aperture of the substrate.

According to a preferable aspect of the present invention, it is desirable that the incident-light controlling means is an optical filter which limits a wavelength range or an amount of light which passes through.

According to another preferable aspect of the present invention, there is provided an optical apparatus including a case in which, a substrate having an optical aperture which is fixed, an incident-light controlling means which is displaceable, a first magnet which is fixed to the incident-light controlling means, and an optical element are disposed, and a coil which is disposed at an outside of the case, and an external field which acts on the first magnet is changed by the coil.

DETAILED DESCRIPTION OF THE INVENTION

Exemplary embodiments of an optical switch according to the present invention will be described below in detail by referring to the accompanying diagrams. However, the present invention is not restricted by the embodiments described below.

First Embodiment

Figure 1:
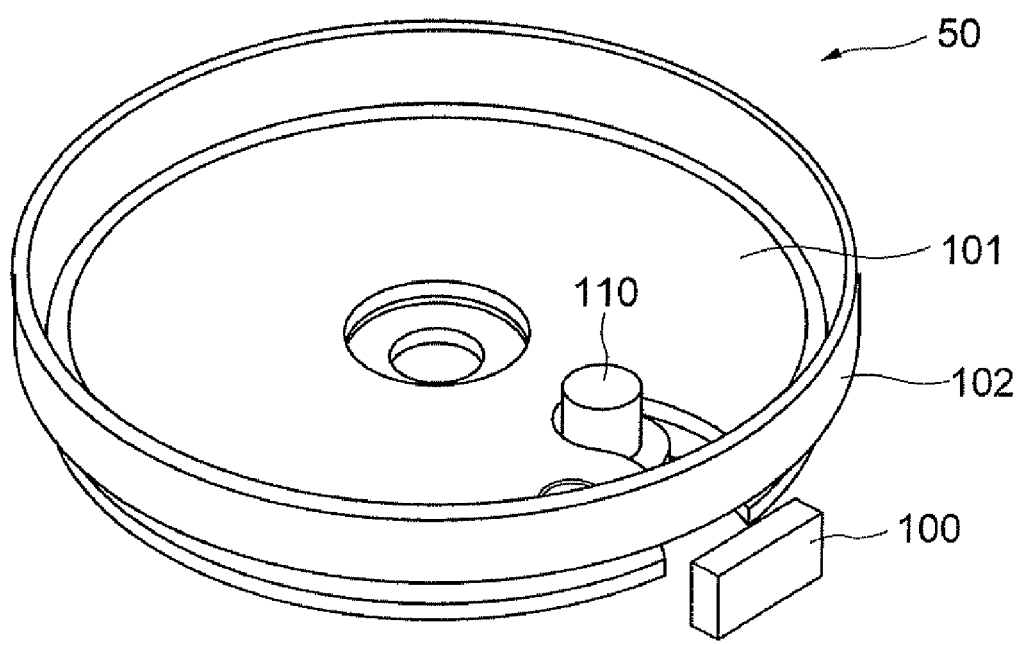
FIG. 1 is a perspective view of a light controlling apparatus of a first embodiment.
Figure 2:
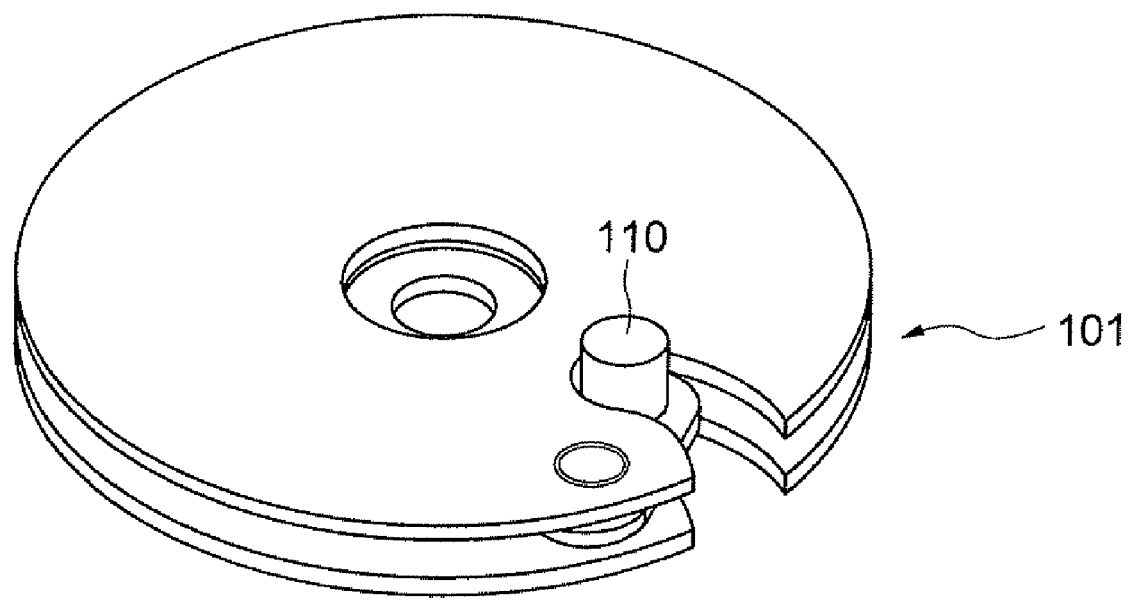
FIG. 2 is a perspective view of a diaphragm mechanism.

A diaphragm unit 50 according to a first embodiment of the present invention will be described by using diagrams from FIG. 1 to FIG. 5. FIG. 1 is a perspective view of the diaphragm unit 50 which is a light controlling apparatus for controlling light which is incident, of the first embodiment. The aperture unit 50 includes an aperture mechanism 101, a coil 102 which is disposed around the aperture mechanism 101, and a second magnet 100. Moreover, FIG. 2 is shows a perspective view of only the aperture mechanism 101. In the first embodiment, when an electric power is not supplied to the coil 102, a first magnet 110 and the second magnet 100 are disposed to be facing mutually to be attached due to a magnetic absorption force. Moreover, an arrangement is made such that, when the electric power is supplied to the coil 102, the first magnet is displaced to a central side of a substrate 103 (central side of the coil 102) due to a magnetic field which is generated.

Figure 3:
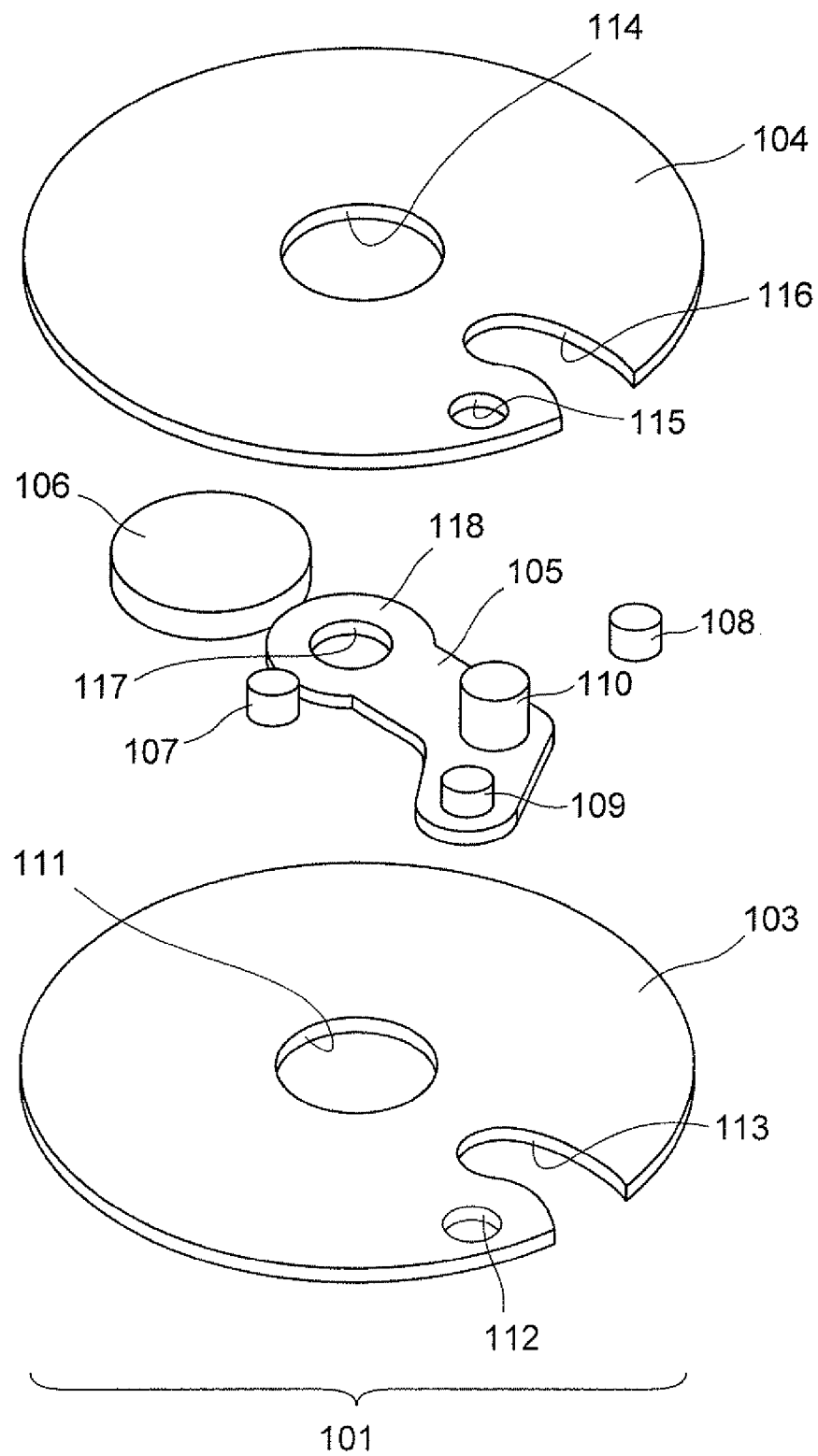
FIG. 3 is an exploded view of the diaphragm mechanism.

FIG. 3 shows an exploded view of the aperture mechanism 101. The aperture mechanism 101 includes a lower substrate 103, an upper substrate 104, a diaphragm blade 105, a spacer 106, a closing stopper 107, and an opening stopper 108, which are stacked as shown in the diagram. Here, a thickness of each of the lower substrate 103, the upper substrate 104, and the diaphragm blade 105 is 0.05 mm, and a thickness of each of the spacer 106, the closing stopper 107, and the opening stopper 108 is 0.1 mm. Moreover, the lower substrate 103, the upper substrate 104, are adhered via the spacer 106, the closing stopper 107, and the opening stopper 108.

A rotating shaft 109 and the circular cylindrical shaped first magnet 110 are press-fitted in the diaphragm blade 105. The rotating shaft 109 has a diameter of 0.15 mm, and a height of 0.2 mm, and the first magnet 110 has a diameter of 0.2 mm and a height of 0.4 mm. An optical aperture 111, a rotating shaft inserting hole 112, and a first magnet guide notch 113 are formed in the lower substrate 103. Moreover, an optical aperture 114, a rotating shaft inserting hole 115, and a first magnet guide notch 116 are similarly formed also in the upper substrate 104. A diameter of the optical aperture 114 is same as a diameter of the optical aperture 111, or is set to be slightly larger than the diameter of the optical aperture 111.

Here, the rotating shaft 109 is inserted into the rotating shaft inserting hole 112 and the rotating shaft inserting hole 115, and the diaphragm blade 105 is rotatably displaceable, with the rotating shaft 109 as a center. A range of rotation is restricted by the closing stopper 107 and the opening stopper 108. Moreover, the first magnet 110 is provided with the first magnet guide notch 113 and the first magnet guide notch 116 in the range of rotatable displacement, and do not make a contact with the lower substrate 103 and the upper substrate 104.

A diaphragm ring 118 having a diaphragm aperture 117 at a center thereof is formed in the diaphragm blade 105. The diaphragm opening 117 is set to be slightly smaller than the optical aperture 111, and an outer diameter of the diaphragm ring 118 is set to be slightly larger than the optical aperture 111.

Here, a relationship of the optical aperture 111 and the diaphragm ring 118 will described below. The diaphragm blade 105 is rotatably displaced, with the rotating shaft 109 as a center. For example, when the diaphragm ring 118 has made a contact with the closing stopper 107, the center of the diaphragm opening 117 and the center of the optical aperture 111 coincide. Moreover, when the diaphragm ring 118 has made a contact with the opening stopper 108, the diaphragm ring 118 is retracted completely entirely from the optical aperture 111.

Figure 4A:
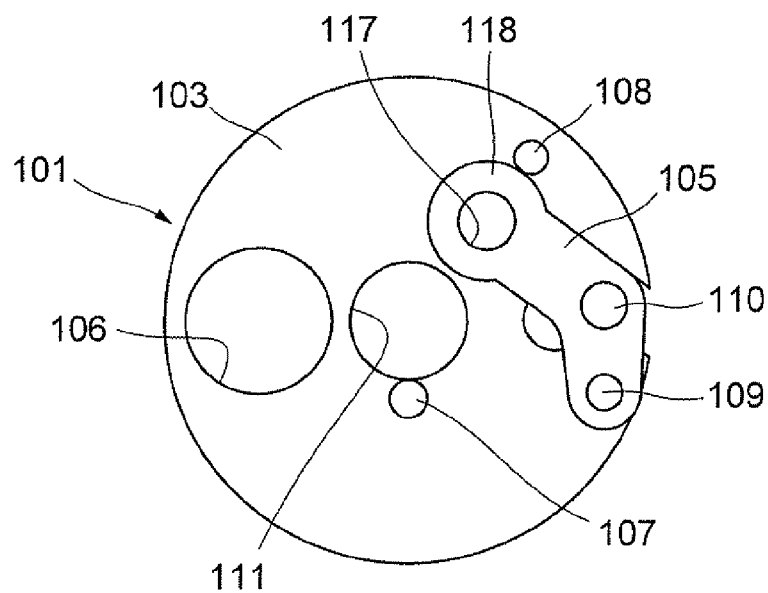
FIG. 4A and FIG. 4B are diagrams describing an operation when no electric power is supplied to a coil.
Figure 4B:
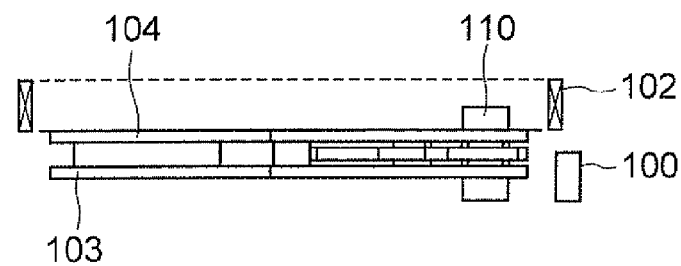
Figure 5A:
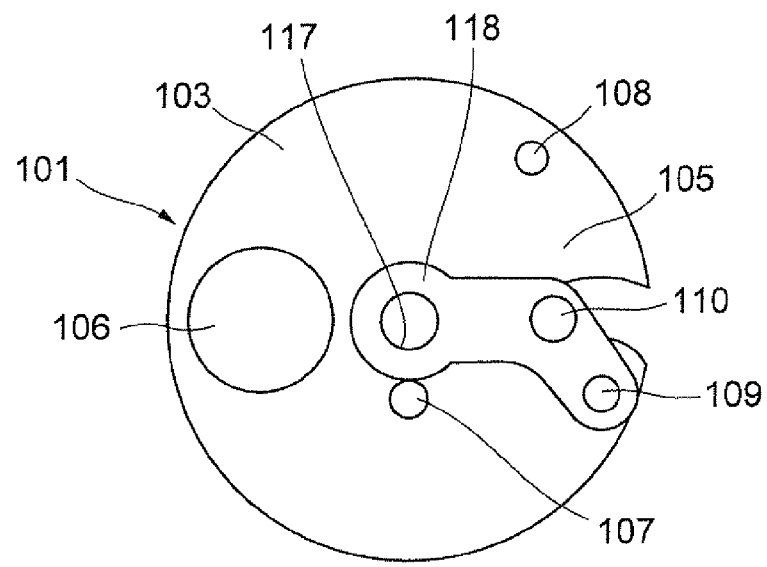
FIG. 5A and FIG. 5B are diagrams describing an operation when an electric power is supplied to the coil.
Figure 5B:
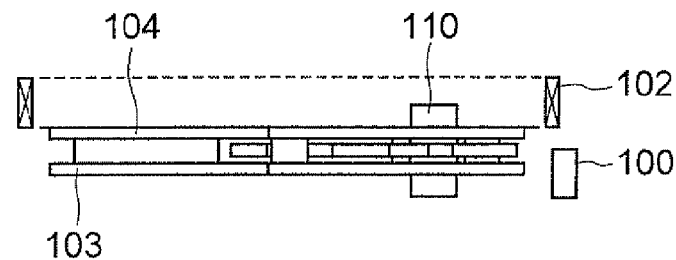

Next, an operation of the diaphragm unit 50 of the first invention will be described by using FIG. 4A, FIG. 4B, FIG. 5A, and FIG. 5B. FIG. 4A and FIG. 4B show a state when the electric power is not supplied to the coil 102, and FIG. 5A and FIG. 5B show a state when the electric power is supplied to the coil 102. Moreover, each of FIG. 4A and FIG. 5A shows a top view, and each of FIG. 4B and FIG. 5B shows a side view. In each of these diagrams, for making the upper view easily understandable, the upper substrate 104, the coil 102, and the second magnet 100 are not shown in the diagram.

Firstly, FIG. 4A and FIG. 4B will be described below. When the electric power is not supplied to the coil 102, the magnetic absorption force acts between the first magnet 110 and the second magnet 100, and the first magnet 110 is displaced at an outer circumference side the lower substrate 103. Therefore, the diaphragm blade 105 rotates around the rotating shaft 109 as a center, in a clockwise direction in the top view till the diaphragm ring 118 makes a contact with the opening stopper 108. As a result, the diaphragm ring 118 assumes a position retracted with respect to the optical aperture 111, and the diaphragm unit 50 is in an open state.

Next, FIG. 5A and FIG. 5B will be described below. The electric power is supplied to the coil 102, and a magnetic field in a predetermined direction is generated in the coil 102. Due to the magnetic field generated in the coil 102, a force directed toward a center of the coil 102, in other words, toward a center of the lower substrate 103 acts. At this time, an arrangement is made such that the force directed toward the center is stronger than the magnetic absorption force acting between the first magnet 110 and the second magnet 100, by setting appropriately an amount of electric power to be supplied to the coil 102. In other words, the first magnet 110 overcomes the magnetic absorption force acting between the first magnet 110 and the second magnet 100, and is displaced toward the center of the lower substrate 103.

Therefore, the diaphragm blade 105 rotates with the rotating shaft 109 as a center, in a counterclockwise direction in the top view, till the diaphragm ring 118 makes a contact with the closing stopper 107. Accordingly, the diaphragm ring 118 covers the optical aperture 111, and the diaphragm unit 50 assumes a narrowed state in which an aperture diameter is regulated by the diaphragm aperture 117.

In this manner, in the diaphragm unit 50 of the first embodiment, by a presence and an absence of the electric power supplied to the coil 102, it is possible to open and close the diaphragm. Moreover, it is possible to maintain an open state of the diaphragm by the magnetic absorption force between the first magnet 110 and the second magnet 100 without supplying the electric power to the coil 102.

For maintaining the narrowed state, it is necessary to continue to supply the electric power to the coil 102. At the time of shifting from the open state to the narrowed state, for securing a sufficient force necessary for the displacement, a substantial electric current may be passed. Whereas, at the time of maintaining the narrowed state, the electric current passed to the coil 102 is reduced to the minimum current which is necessary. Accordingly, it is desirable to suppress a heat generation and an electric power consumption of the coil 102.

Moreover, as a modification of the structure in the first embodiment, a structure in which the second magnet 100 is omitted may be taken into consideration. In this case, the opening and closing of the diaphragm is carried out by changing a polarity of an electric current flowing through the coil 102. However, in this case, even in an open state and in the narrowed state of the aperture, it is necessary to continue to supply the electric power to the coil 102 for maintaining that state.

Second Embodiment

Figure 6:
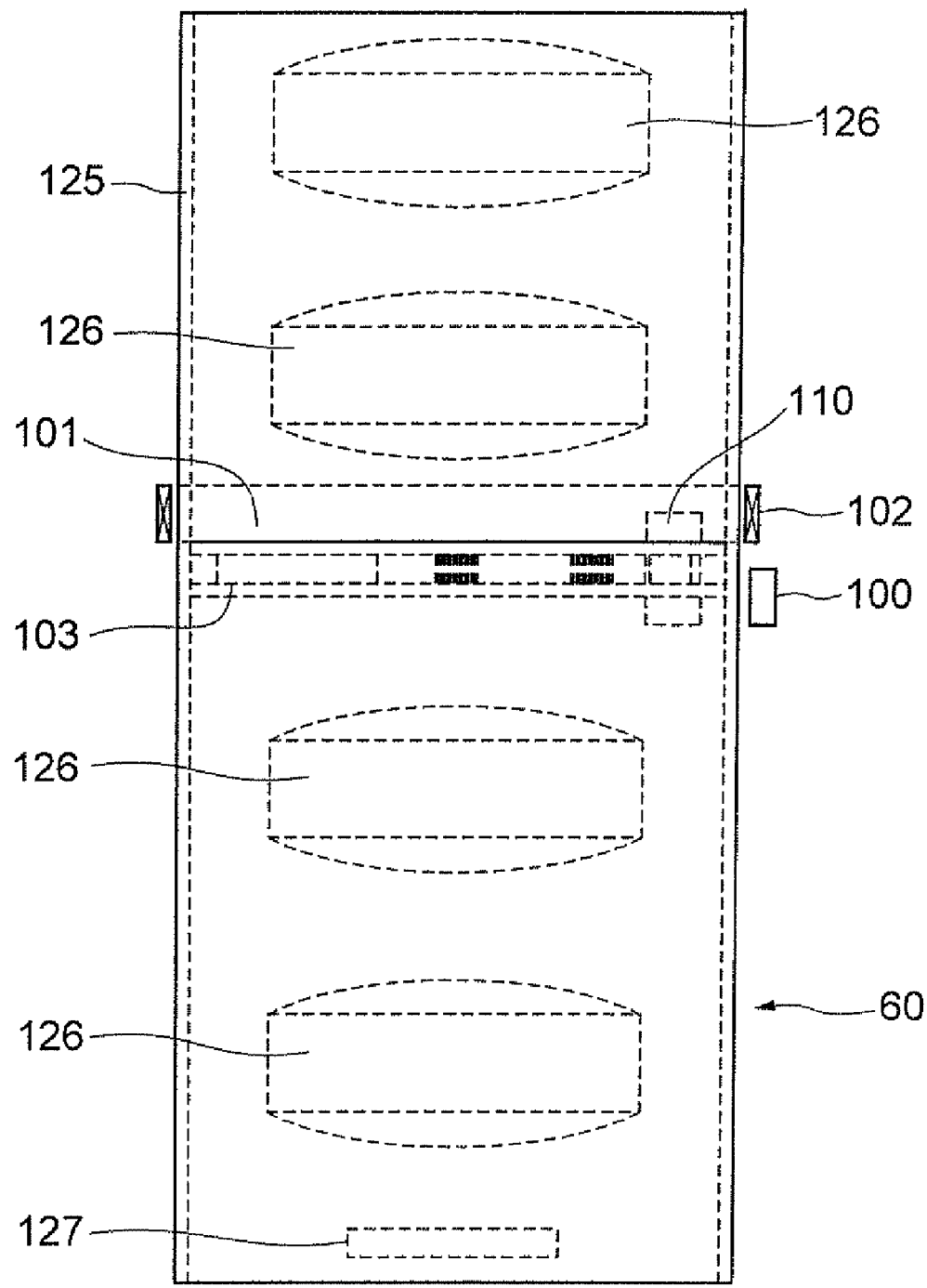
FIG. 6 is a diagram showing a structure of an optical apparatus of a second embodiment.
Figure 7:
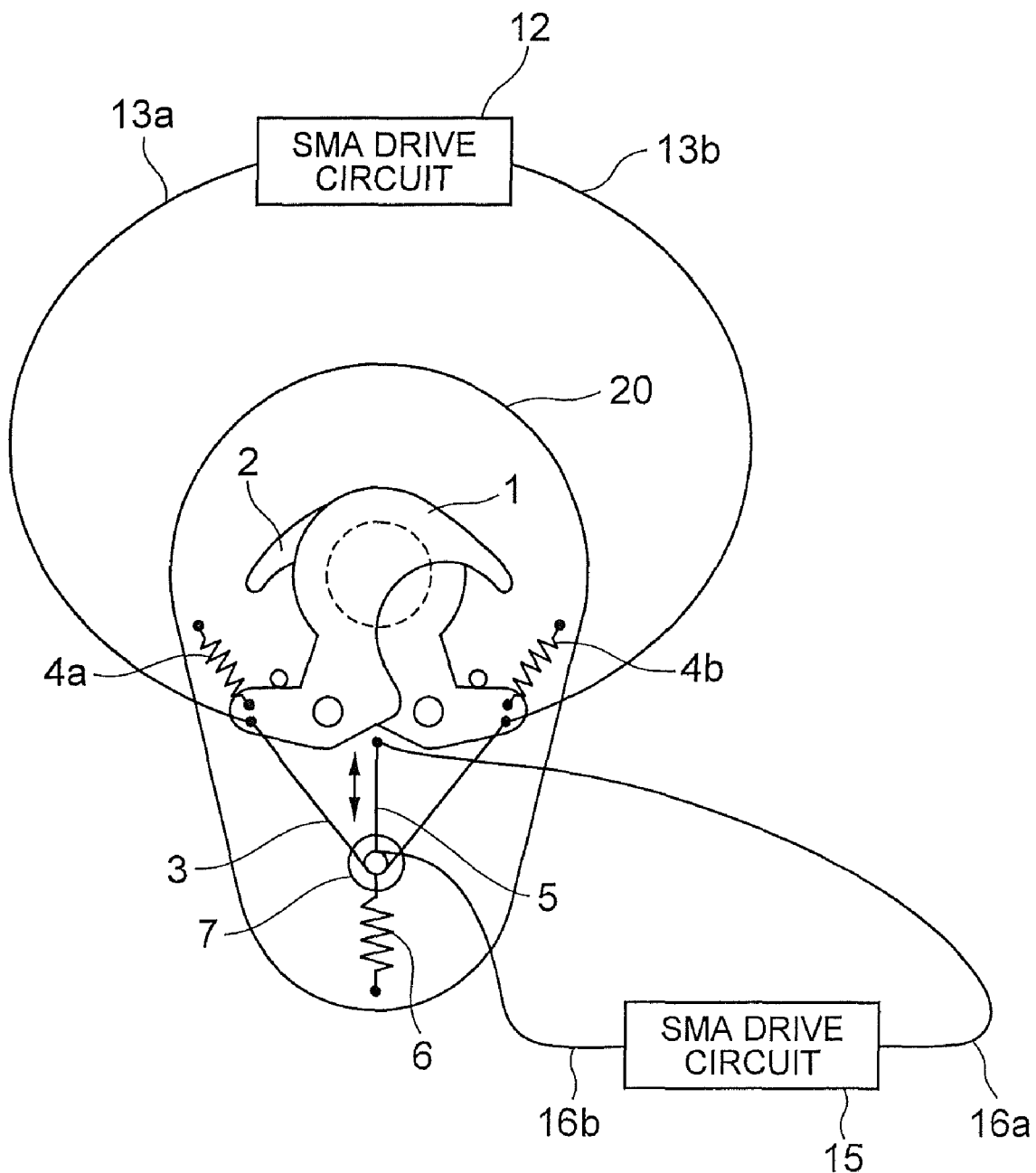
FIG. 7 is a diagram showing a structure of a conventional aperture controlling mechanism.

Next, an optical apparatus 60 according to a second embodiment of the present invention will be described below. Same reference numerals are assigned to components which are same as in the first embodiment, and description to be repeated is omitted. A case of using the diaphragm unit described above in an actual image pickup optical system will be described by using FIG. 6.

A plurality of lenses 126, an image pickup element 127, and a diaphragm mechanism 101 are disposed in a case 125 having a circular cylindrical shape. The coil 102 and the second magnet 100 are disposed at an outer side of the case 125. As it has been described by using FIG. 4A and FIG. 4B, and FIG. 5A and FIG. 5B, the diaphragm is opened and closed by displacing the first magnet 110 according to the supply of the electric power to the coil 102. In this manner, in an optical apparatus 200 of the second embodiment, an electrical wiring is not necessary in the diaphragm mechanism 101. Therefore, it is possible to open and close the diaphragm without drawing a wire for opening and closing of the aperture, from inside the case 125 in which the optical system is accommodated.

Furthermore, in the second embodiment, only the coil 102 and the second magnet 100 are to be disposed outside the case 125, and an occupied area on a surface perpendicular to an optical axis is small. Accordingly, it is suitable for particularly an application such as in an endoscope where, making a diameter fine has been sought strongly.

Moreover, by replacing the diaphragm ring in the second embodiment by an optical filter, it is also possible to use as an optical filter attaching and detaching apparatus which changes an amount of light passing through, or a transmission wavelength area.

As it has been described above, the light controlling apparatus and the optical apparatus according to the present invention are useful for a small-size image pickup element, and particularly are suitable for an apparatus in which a casing which seals an image pickup system, and making the diameter small have been sought.

In the light controlling apparatus and the optical apparatus according to the present invention, since it is not necessary to draw a wire for controlling from the diaphragm mechanism, narrowing of a diaphragm controlling mechanism in a small-size image pickup apparatus with a narrow gap between the lenses becomes easy. Moreover, it is possible to make small a size of the light controlling apparatus and the optical apparatus. Furthermore, since it is not necessary to draw a wire, an effect that it is applicable to an apparatus in which the light controlling apparatus is sealed, is shown.

What is claimed is:

1. A light controlling apparatus, comprising:
a substrate having an optical aperture;
an incident-light controlling means which is displaceable;
a first magnet which is fixed to the incident-light controlling means; and
a coil which is disposed around the substrate;
wherein an external magnetic field which acts on the first magnet is changed according to a change in an electric power supply to the coil, the incident-light controlling means is displaced by displaying the first magnet according to the change in the external magnetic field and the incident-light controlling means is a diaphragm ring which has an opening smaller than the optical aperture of the substrate.

* * * * *